United States Patent
Kim et al.

(10) Patent No.: US 10,172,104 B2
(45) Date of Patent: *Jan. 1, 2019

(54) POWER HEADROOM REPORTING METHOD AND DEVICE FOR WIRELESS COMMUNICATION SYSTEM

(71) Applicant: Samsung Electronics Co., Ltd., Gyeonggi-do (KR)

(72) Inventors: Soeng-Hun Kim, Gyeonggi-do (KR); Gert Jan Van Lieshout, Apeldoorn (NL); Kyeong-In Jeong, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/671,709

(22) Filed: Aug. 8, 2017

(65) Prior Publication Data
US 2017/0359787 A1    Dec. 14, 2017

Related U.S. Application Data

(63) Continuation of application No. 15/250,032, filed on Aug. 29, 2016, now Pat. No. 9,730,169, which is a
(Continued)

(51) Int. Cl.
*H04W 52/36* (2009.01)
*H04B 17/24* (2015.01)
(Continued)

(52) U.S. Cl.
CPC .......... *H04W 52/365* (2013.01); *H04B 17/24* (2015.01); *H04W 52/34* (2013.01); *H04W 52/367* (2013.01); *H04W 88/02* (2013.01)

(58) Field of Classification Search
CPC . H04W 52/365; H04W 52/34; H04W 52/367; H04W 88/02; H04B 17/24
See application file for complete search history.

(56) References Cited

U.S. PATENT DOCUMENTS 8,249,091 B2 * 8/2012 Kim .................... H04W 52/367
                                                             370/329
8,306,544 B2   11/2012 Ishii
(Continued)

FOREIGN PATENT DOCUMENTS

CN        101340712        1/2009
JP        2010-226720      10/2010
(Continued)

OTHER PUBLICATIONS

ZTE, "Considerations on Scheduling in Carrier Aggregation", R2-093886, 3GPP TSG RAN WG2 Meeting #66bis, Jun. 29-Jul. 3, 2009.
(Continued)

*Primary Examiner* — Phuc H Tran
(74) *Attorney, Agent, or Firm* — The Farrell Law Firm, P.C.

(57) ABSTRACT

Methods and apparatus are provided in which a configuration message to configure at least one uplink carrier is received. A power headroom report (PHR) is triggered for a first uplink carrier if a predetermined event occurs. An allocation of an uplink transmission resource is detected for the PHR. It is identified whether the first uplink carrier for which a power headroom (PH) is to be determined is different from a second carrier to which the uplink transmission resource is allocated. The PH is determined based on a first pathloss associated with the first uplink carrier, if the first uplink carrier is different from the second carrier. The PHR generated based the determined PH is transmitted.

10 Claims, 14 Drawing Sheets

Related U.S. Application Data continuation of application No. 13/551,155, filed on Jul. 17, 2012, now Pat. No. 9,432,956, which is a continuation of application No. 12/603,033, filed on Oct. 21, 2009, now Pat. No. 8,249,091.

(51) Int. Cl.
*H04W 52/34* (2009.01)
*H04W 88/02* (2009.01)

(56) References Cited

U.S. PATENT DOCUMENTS

| | | | |
|---|---|---|---|
| 8,391,129 | B2 | 3/2013 | Dinan |
| 8,570,959 | B2 | 10/2013 | Ishii |
| 8,693,383 | B2 | 4/2014 | Damnjanovic |
| 8,862,174 | B2 | 10/2014 | Zhao et al. |
| 8,953,551 | B2 | 2/2015 | Inoue |
| 9,167,540 | B2 | 10/2015 | Larsson |
| 9,432,956 | B2 * | 8/2016 | Kim .............. H04W 52/367 |
| 9,730,169 | B2 * | 8/2017 | Kim .............. H04W 52/367 |
| 2004/0041697 | A1 | 3/2004 | Nattkemper |
| 2009/0175187 | A1 | 7/2009 | Jersenius |
| 2010/0238863 | A1 | 9/2010 | Guo et al. |
| 2010/0272091 | A1 | 10/2010 | Fablen |
| 2011/0034206 | A1 | 2/2011 | Venkatraman et al. |
| 2011/0164519 | A1 | 7/2011 | Nishio et al. |
| 2011/0264001 | A1 | 10/2011 | Cheung et al. |
| 2011/0281525 | A1 | 11/2011 | Furuskar et al. |
| 2012/0083308 | A1 | 4/2012 | Wang et al. |
| 2016/0073360 | A1 | 3/2016 | Uchlno et al. |

FOREIGN PATENT DOCUMENTS

| | | |
|---|---|---|
| JP | 2012-515343 | 7/2012 |
| JP | 2012-530428 | 11/2012 |
| JP | 2014-233009 | 12/2014 |
| WO | WO 2008/115110 | 9/2008 |

OTHER PUBLICATIONS

CATT, "Minor Correction to PHR", R2-093762, 3GPP TSG-RAN2 Meeting #66bis, Jun. 29-Jul. 3, 2009.
Samsung, "PHR Inclusion in msg3 Re-Transmissions", R2-093724, 3GPP TSG RAN WG2 #66, May 4-8, 2009.
Nokia Corporation, Nokia Siemens Networks, "Power Headroom Reporting", R2-082197, 3GPP TSG-RAN WG2 Meeting #62, May 5-9, 2008.
3rd Generation Partnership Project; Technical Specification Group Radio Access Network; Evolved Universal Terrestrial Radio Access (E-UTRA) Medium Access Control (MAC) Protocol Specification (Release 8), 3GPP TS 36.321 V8.4.0, Dec. 2008.
Alcatel-Lucent, "TP on Power Headroom Reporting", R2-082224, 3GPP TSG RAN WG2 #62, May 5-9, 2008.
Ericsson, "UE Transmission Power Headroom Report for LTE", R2-082147, 3GPP TSG RAN WG2 #62, May 5-9, 2008.
Renesas Mobile Europe, "Discussion on PHR in Multiple TA", R2-120128, Feb. 6-10, 2012, 3 pages.
Japanese Office Action dated Jun. 27, 2016 issued in counterpart application No. 2015-079542, 13 pages.
Huawei, "UL Power Control in Carrier Aggregation", R1-093840, 3GPP TSG RAN WG1 Meeting #58bis, Oct. 12-16, 2009.
Nokia Siemens Networks, Nokia Corporation, "Triggers for Power Headroom Reports in EUTRAN Uplink", R1-080947, 3GPP TSG RAN WG1 #52 Meeting, Feb. 11-15, 2008.
Huawei, "Discussion on Supplementary Carrier Control", R1-083076, 3GPP TSG-RAN WG1 #54, Aug. 18-22, 2008.
European Search Report dated Mar. 5, 2015 issued in counterpart application No. 10825184.4-1855.
Chinese Office Action dated Apr. 1, 2015 issued in counterpart application No. 201080047774.X.
CATT, "Impact of CA on MAC Layer", R2-094326, 3GPP TSG-RAN WG2 #67, Aug. 24-28, 2009, 4 pages.
Samsung, "The Need for Additional Activation Procedure in Carrier Aggregation", R2-095874, 3GPP TSG-RAN2#67bis Meeting, Oct. 12-16, 2009, 4 pages.
NEC, "Component Carrier Configuration/Activation for Carrier Aggregation", R2-094240, 3GPP TSG RAN2 Meeting #67, Aug. 24-28, 2009, 3 pages.
Japanese Office Action dated Jan. 10, 2017 issued in counterpart application No. 2015-079542, 15 pages.
Research in Motion UK Limited, "Uplink Power Control for Carrier Aggregation", R1-093297, 3GPP TSG RAN WG1 Meeting #58, Aug. 24-28, 2009, 3 pages.
Ericsson, "Trigger Criteria for Power Headroom Reporting", R1-081535, 3GPP TSG-RAN WG1 #52bis, Mar. 31-Apr. 4, 2008, 2 pages.
Korean Office Action dated May 30, 2017 issued in counterpart application No. 10-2012-7010355, 9 pages.

\* cited by examiner

POWER HEADROOM REPORTING METHOD AND DEVICE FOR WIRELESS COMMUNICATION SYSTEM

CROSS REFERENCE TO RELATED APPLICATION

This application is a continuation application of U.S. patent application Ser. No. 15/250,032, which was filed in the U.S. Patent and Trademark Office (USPTO) on Aug. 29, 2016, issued as U.S. Pat. No. 9,730,169 on Aug. 8, 2017, which is a continuation application of U.S. patent application Ser. No. 13/551,155, which was filed in the USPTO on Jul. 17, 2012, and issued as U.S. Pat. No. 9,432,956 on Aug. 30, 2016, which is a continuation application of U.S. patent application Ser. No. 12/603,033, which was filed in the USPTO on Oct. 21, 2009, and issued as U.S. Pat. No. 8,249,091 on Aug. 21, 2012, the content of each of which is incorporated herein by reference.

BACKGROUND OF THE INVENTION

1. Field of the Invention

The present invention relates generally to wireless communication systems, and more particularly, to the reporting of Power Headroom (PH) from a User Equipment (UE) in a wireless communication system that supports carrier aggregation.

2. Description of the Related Art

Mobile communication systems were originally designed to provide users with voice communication services while they are on the move. Current mobile communication systems are capable of supporting both voice communication services and data communication services for mobile users.

Standardization for a next generation of mobile communication technology for the 3rd Generation Partnership Project (3GPP) is being conducted for Long Term Evolution (LTE). LTE is a broadband packet-based communication technology that is expected to provide download speeds that improve upon existing data transmission rates by up to 100 Megabytes/second (Mbps). In attempting to achieve such a high data rate, studies have been conducted that use a minimum number of nodes in connection with a simplified network topology, and that place a radio protocol as close as possible to radio channels.

FIG. 1 is a diagram illustrating an LTE wireless communication system. The LTE wireless communication system includes a plurality of Evolved Node Bs (ENBs) 105, 110, 115 and 120, a Mobility Management Entity (MME) 125, and a Serving Gateway (S-GW) 130. ENBs 105, 110, 115 and 120 are coupled to the S-GW 130, enabling a UE 135 to connect to a core network. The ENBs 105, 110, 115 and 120 correspond to Node Bs of a Universal Mobile Telecommunications System (UMTS) and perform more complex functions than those of a legacy Node B. In the LTE system, all user traffic, including real time services such as Voice over Internet Protocol (VoIP), are provided through a shared channel. Each of the ENBs 105, 110, 115 and 120 manage one or more cells, and are responsible for the collection of status information from UEs and for the scheduling of traffic.

In order to support transmission bandwidths of up to 20 megahertz (MHz), LTE employs Orthogonal Frequency Division Multiplexing (OFDM) as its basic modulation scheme. LTE also uses Adaptive Modulation and Coding (AMC) to improve data throughput. AMC varies downlink modulation and coding schemes based on channel conditions for each UE. The S-GW 130 is responsible for managing data bearers and establishes or releases data bearers under the control of the MME 125. The MME 125 is in communication with the S-GW 130 and is responsible for control plane functions.

FIG. 2 is a diagram illustrating a user plane protocol stack for use in the LTE architecture of FIG. 1. A mobile terminal, or UE, 200 has a protocol stack having a Packet Data Convergence Protocol (PDCP) layer 205, a Radio Link Control (RLC) layer 210, a Media Access Control (MAC) layer 215, and a Physical (PHY) layer 220. A base station, or ENB, 201 has a protocol stack having a PDCP layer 240, an RLC layer 235, a MAC layer 230, and a PHY layer 225. The PDCP layers 205 and 240 are responsible for Internet Protocol (IP) header compression/decompression. The RLC layers 210 and 235 pack the PDCP Packet Data Units (PDUs) into a size appropriate for transmission and perform an Automatic Repeat reQuest (ARQ) function. The MAC layers 215 and 230 serve multiple RLC layer entities. These layers are capable of multiplexing the RLC PDUs into a MAC PDU, and demultiplexing the MAC PDU into the RLC PDUs. The PHY layers 220 and 225 perform encoding and modulation on upper layer data for transmission through a radio channel, and perform demodulation and decoding on the OFDM symbol received through the radio channel for delivery to upper layers. A data unit that is input to a protocol entity is referred to as a Service Data Unit (SDU) and a data unit that is output from the protocol entity is referred to as a Protocol Data Unit.

A voice communication service of a wireless communication system requires a relatively small amount of dedicated bandwidth. However, a data communication service must allocate resources in consideration of a data amount and a channel condition so that transmission throughput may increase. Thus, a mobile communication system is provided with a scheduler that manages resource allocation with respect to available resources, channel conditions, an amount of transmission data, etc. Resource scheduling is also required in LTE, and a scheduler that is incorporated into a base station, or ENB, is used to manage radio transmission resources.

In order to meet International Mobile Telephony (IMT)-Advanced requirements that extend beyond those of IMT-2000, further technological advancements have allowed for the evolution of LTE into LTE-Advanced (LTE-A). LTE-A is provided with technological components, such as carrier aggregation, to fulfill the IMT-Advanced requirements. Carrier aggregation aggregates multiple carriers to form a larger bandwidth, thereby allowing a UE to transmit and receive data at higher data rates.

FIG. 3 is a schematic diagram illustrating an LTE-A wireless communication system supporting carrier aggregation. An ENB 305 operates on two different carriers 310 and 315, having center frequencies of f3 and f1, respectively. A conventional wireless communication system allows a UE 330 to communicate with the ENB 305 using only one of carriers 310 and 315. However, the LTE-A system supporting carrier aggregation enables the UE 330 to use both carriers 310 and 315 in order to increase transmission throughput. The maximum data rate between the ENB 305 and the UE 330 increases in proportion to the number of carriers that are aggregated.

Due to the fact that uplink transmissions cause inter-cell interference, it is preferable for a UE to calculate an uplink transmission power using a predetermined function, and to control uplink transmission based on the calculation. The predetermined function may utilize variables such as an allocated transmission resource amount, a Modulation and Coding Scheme (MCS), and a path loss value in calculating a required uplink transmission power. The uplink transmission power is limited to a UE maximum transmission power. When the required uplink transmission power is greater than the UE maximum transmission power, the UE performs the uplink transmission using the UE maximum transmission power. However, use of the maximum transmission power instead of the required transmission power degrades the uplink transmission quality. Thus, it is preferable for the ENB to perform scheduling for UE transmissions such that a required transmission power for the UE transmission will not exceed the UE maximum transmission power.

Some parameters utilized in scheduling at the ENB, such as channel path loss, are not capable of being measured at the ENB. When required, the UE may transmit a Power Headroom Report (PHR) to the ENB to report UE Power Headroom (PH) with respect to path loss. However, conventional uplink transmission power determination procedures are performed with respect to a single downlink carrier and a single uplink carrier. Thus, the conventional procedures are not applicable to the LTE-A system supporting carrier aggregation.

SUMMARY OF THE INVENTION

The present invention has been made to address at least the above problems and/or disadvantages and to provide at least the advantages described below.

Accordingly, an aspect of the present invention provides a PH reporting method and device for a wireless communication system supporting carrier aggregation that allows a UE to report available PH per uplink carrier.

According to an aspect of the present invention, a method of a terminal in a wireless communication system is provided. A configuration message to configure at least one uplink carrier is received. A power headroom report (PHR) is triggered for a first uplink carrier if a predetermined event occurs. An allocation of an uplink transmission resource is detected for the PHR. It is identified whether the first uplink carrier for which a power headroom (PH) is to be determined is different from a second carrier to which the uplink transmission resource is allocated. The PH is determined based on a first pathloss associated with the first uplink carrier, if the first uplink carrier is different from the second carrier. The PHR generated based the determined PH is transmitted.

BRIEF DESCRIPTION OF THE DRAWINGS

The above and other aspects, features and advantages of the present invention will be more apparent from the following description when taken in conjunction with the accompanying drawings, in which.

DETAILED DESCRIPTION OF EMBODIMENTS OF THE PRESENT INVENTION

Figure 1:
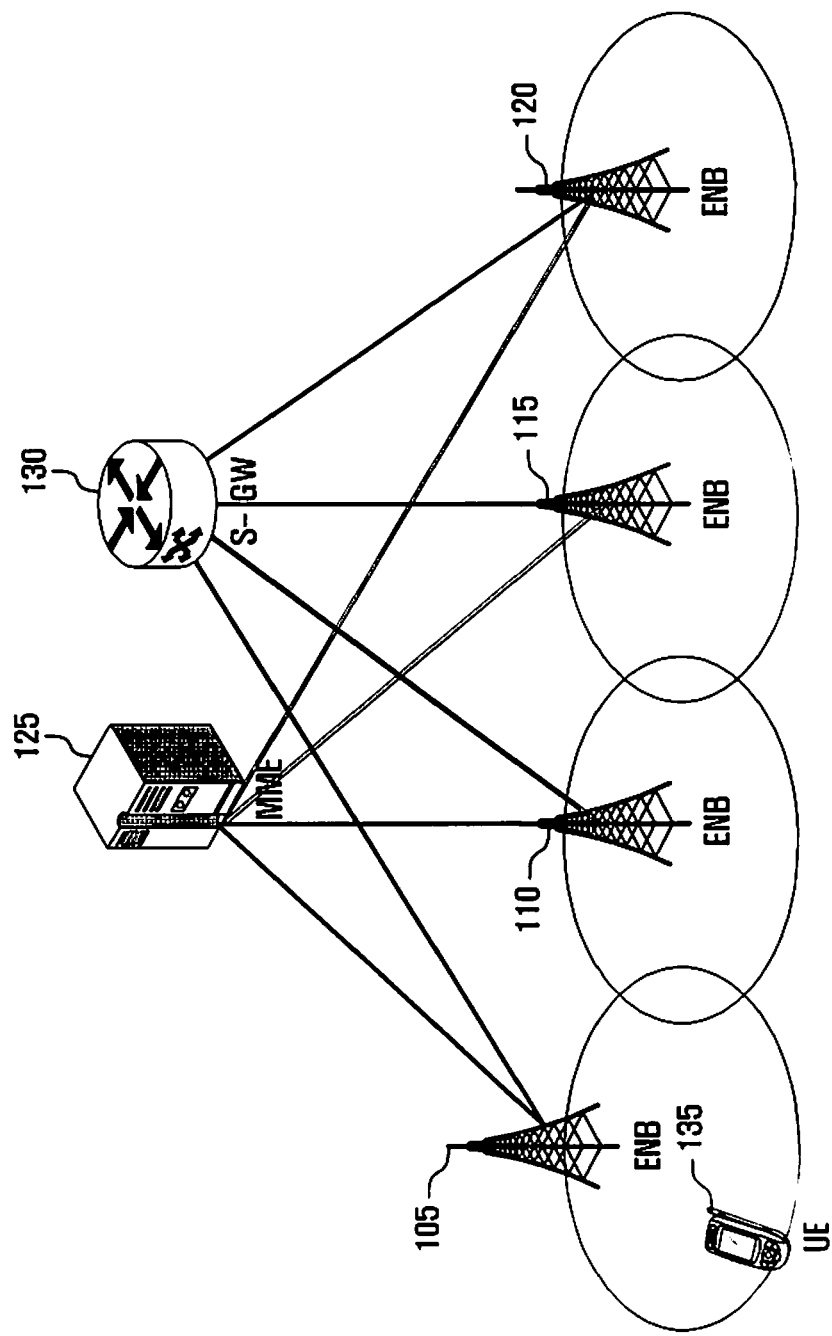
FIG. 1 is a diagram illustrating an LTE wireless communication system.
Figure 2:
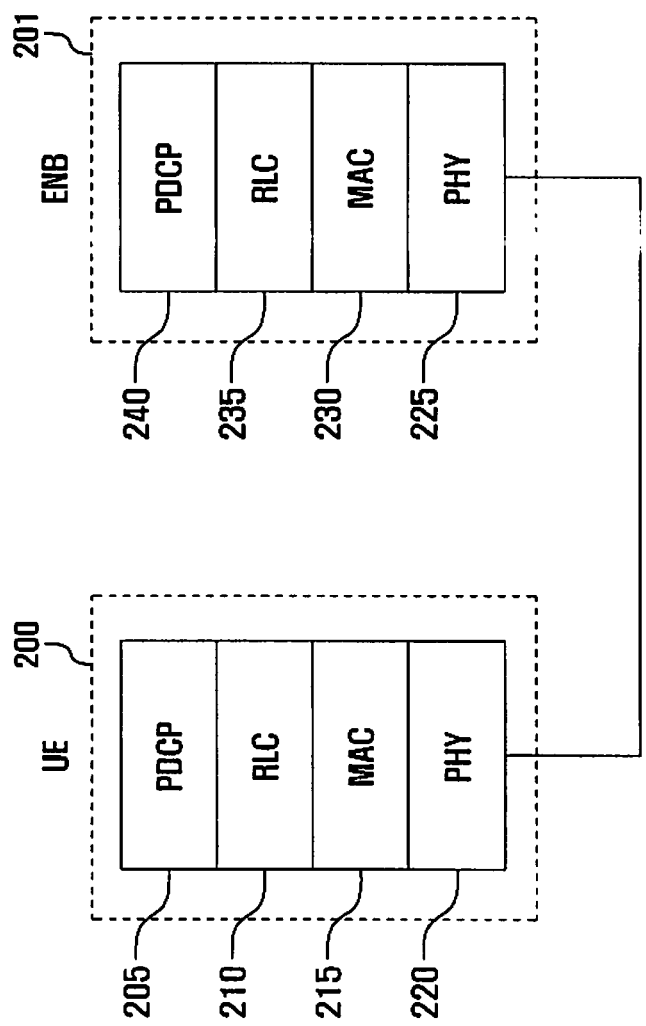
FIG. 2 is a diagram illustrating a user plane protocol stack for use in the LTE wireless communication system architecture of FIG. 1.
Figure 3:
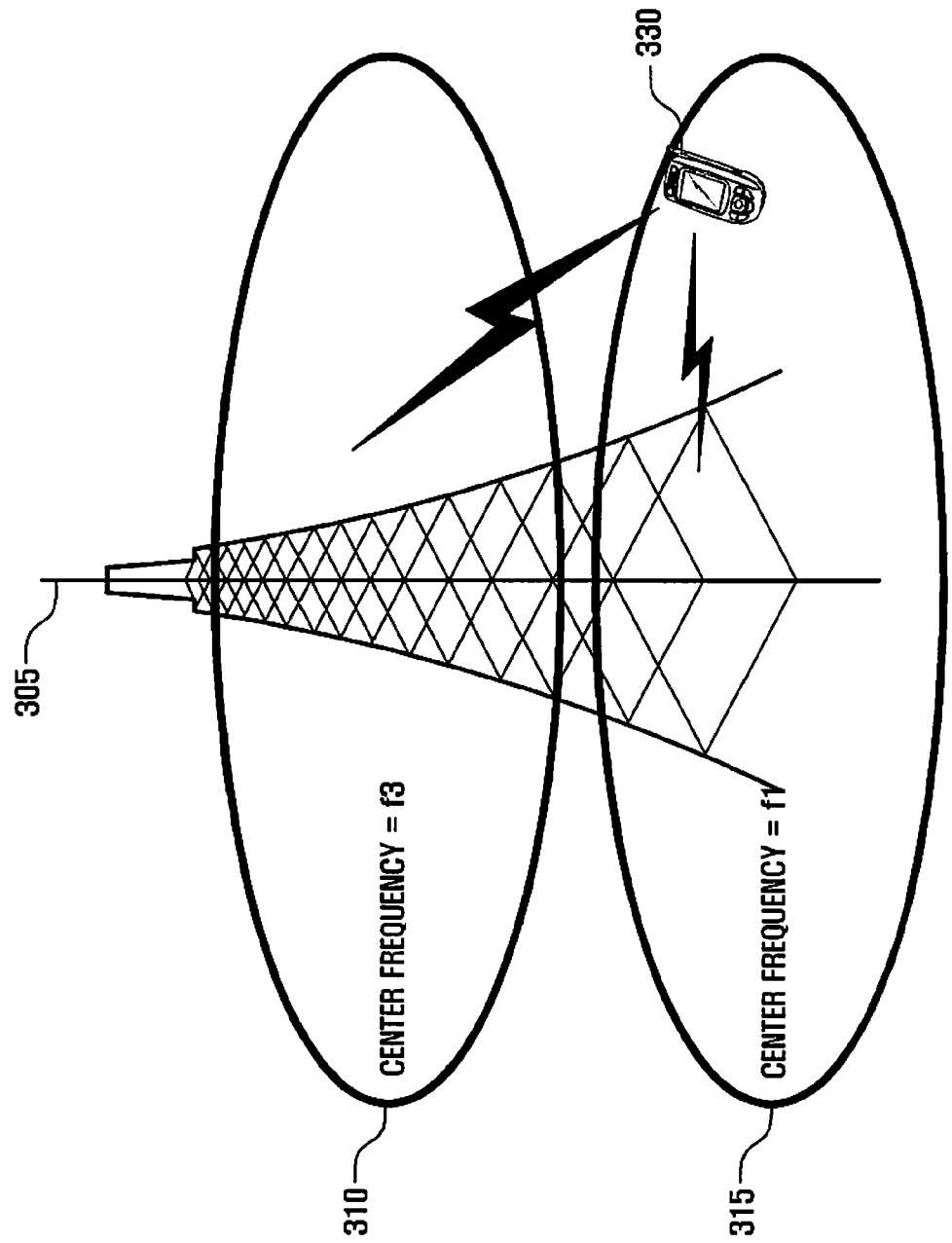
FIG. 3 is a schematic diagram illustrating an LTE-A wireless communication system supporting carrier aggregation.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms and words used in the following description and claims are not limited to their dictionary meanings, but are merely used to enable a clear and consistent understanding of the invention. Accordingly, it should be apparent to those skilled in the art that the following description of embodiments of the present invention are provided for illustrative purposes only and not for the purpose of limiting the invention, as defined by the appended claims and their equivalents.

It is to be understood that the singular forms "a," "an," and "the" include plural referents unless the context clearly dictates otherwise. Thus, for example, reference to "an identifier" includes reference to one or more of such identifiers.

Exemplary embodiments of the present invention provide methods in which a UE reports available PH in a wireless communication system supporting carrier aggregation.

Figure 4:
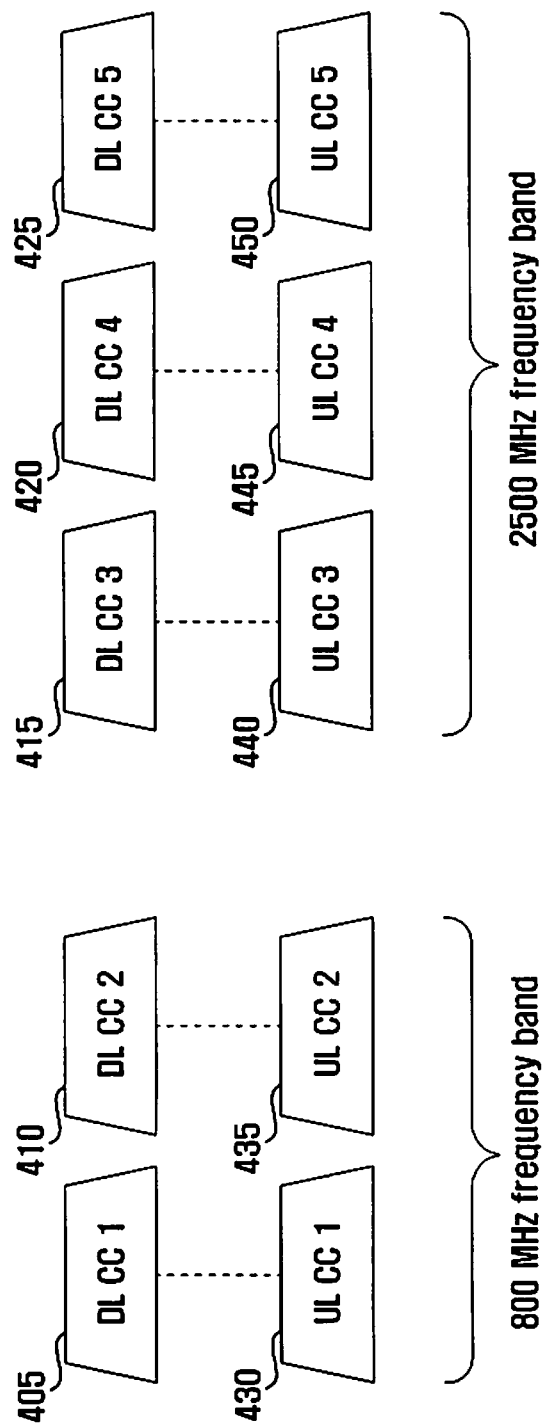
FIG. 4 is a diagram illustrating transmission of PHR when adjacent uplink carriers are aggregated in an LTE-A wireless communication system, according to an embodiment of the present invention.

Referring to FIG. 4, a diagram illustrates transmission of a PHR when adjacent uplink carriers are aggregated in an LTE-A wireless communication system, according to an embodiment of the present invention. PH is affected by an allocated transmission resource amount, an MCS level to be adopted for an uplink transmission, a Path Loss (PL) of a corresponding downlink carrier, and an accumulated power adjustment command, or Transmission Power Control (TPC), value. Due to the fact that the PL of the corresponding downlink carrier and the accumulated power adjustment command value vary depending on an uplink carrier, it is preferable for a UE operating in a carrier aggregation mode to transmit a PHR per uplink carrier. However, when aggregated uplink carriers are adjacent, it is more efficient to transmit a PHR, then determine PHs of adjacent uplink carriers based on the PH in the transmitted PHR.

Specifically, with reference to FIG. 4, five carriers are shown. Downlink carriers, or DownLink Component Carriers (DL CCs) 405 and 410, and respective uplink carriers, or UpLink Component Carriers (UL CCs) 430 and 435 belong to an 800 MHz frequency band. Downlink carriers, or DL CCs, 415, 420 and 425, and respective uplink carriers, or UL CCs, 440, 445 and 450 belong to a 2500 MHz frequency band. Relationships between downlink and uplink carriers are provided to a UE through a control message relating to carrier aggregation. When the PHs of uplink carriers 430 and 435 are determined, similar path losses and accumulated power adjustment command values are utilized. Therefore, it is efficient to transmit a PHR of one of uplink carriers 430 and 435. The PH of the remaining uplink carrier is determined based on the transmitted PH. Similarly, since the PHs of uplink carriers 440, 445 and 450 belong to the same 2500 MHz frequency band, they are also determined using similar path losses and accumulated power adjustment command values. Therefore, it is preferable to transmit a PHR of one of the three uplink carriers, then have the PHs of the remaining two adjacent uplink carriers determined based on the transmitted PHR.

In accordance with a first embodiment of the present invention, a PHR is triggered when a path loss utilized in a last PHR has changed in value by more than a reference value, or when a predetermined time has elapsed after the transmission of the last PHR. Although the PHR may be triggered, a UE does not transmit the PHR immediately, but instead waits until a transmission is available. Specifically, the UE waits until an uplink transmission resource is allocated. After the PHR is triggered, the UE transmits the PHR on the first uplink transmission. The PHR is MAC layer control information, and is transmitted in an 8-bit PH MAC control element. The first two bits of the PH MAC control element are reserved, and the remaining 6 bits are used to indicate a PH level in a range between −23 dB and 40 dB.

As described above, when multiple carriers are aggregated, different PHRs are triggered for different carriers at different times. Thus, information is provided that specifies which uplink carrier is related to a PHR transmitted at a specific time. In the first embodiment of the present invention, the first two reserved bits are used to carry information relating to an identity of an uplink carrier. This information in the PH MAC control element is referred to as a PHR Identifier (PHR ID).

A UE may aggregate multiple uplink carriers in a call establishment procedure and transmit PHRs relating to some of the aggregated uplink carriers. The ENB assigns PHR IDs for the uplink carriers, which are used when the UE generates and transmits the PHRs.

When the uplink carrier on which the PHR is triggered (a PHR-triggered uplink carrier) is identical to the uplink carrier on which a MAC PDU carries the PHR (a PHR-transmitting uplink carrier), the PH is defined as a difference between a nominal UE maximum transmission power and a transmission power required to transmit the MAC PDU carrying the PHR.

When the PHR-triggered uplink carrier is not identical to the PHR-transmitting uplink carrier, the UE calculates the PH assuming that the MAC PDU containing the PHR is transmitted on the PHR-triggered uplink carrier. For example, when a PHR triggered for a first uplink carrier is transmitted via a MAC PDU on a second uplink carrier, the PHR indicates a PH level that is calculated based on a transmission power ($P_{UL\ TX}$) required when the MAC PDU is transmitted on the first uplink carrier. Specifically, the UE calculates the PH using Equation (1):

$$PH = P_{CMAX} - P_{UL\ TX}$$

$$P_{UL\ TX} = f_1(\text{number of resource blocks, MCS level, PL, accumulated TPC}) \quad (1)$$

In this first embodiment of the present invention, the PH is calculated by entering the PL of the PHR-triggered uplink carrier and the accumulated Transmission Power Control (TPC) into Equation (1). Here, $f_1$ denotes a function for calculating the required transmission power, $P_{UL\ TX}$, and is used to obtain a value proportional of the input value. $P_{CMAX}$ is the nominal UE maximum transmission power.

Figure 5:
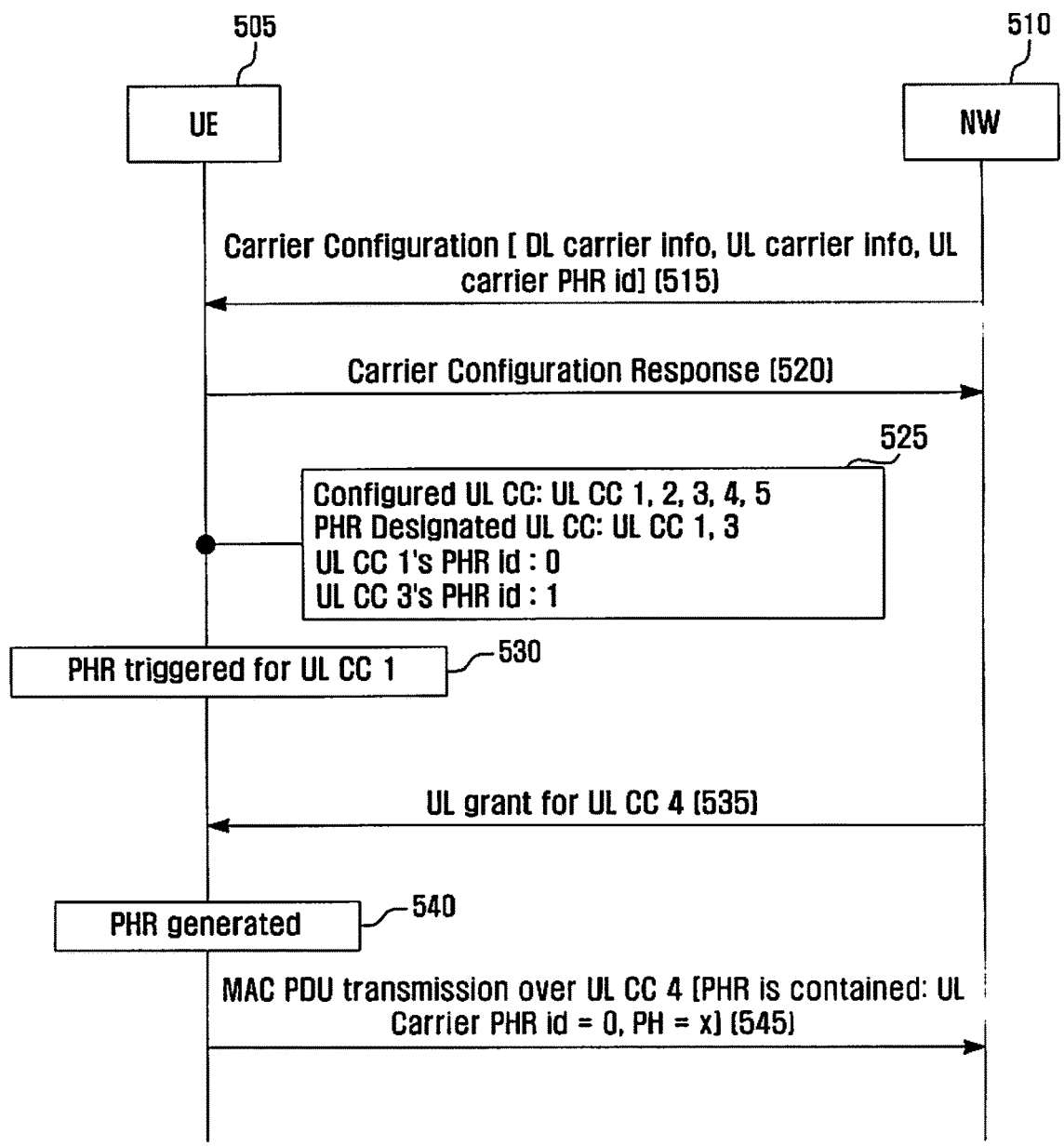
FIG. 5 is a diagram illustrating operations of an LTE-A wireless communication system, according to a first embodiment of the present invention.

FIG. 5 is a diagram illustrating operations of an LTE-A wireless communication system, according to the first embodiment of the present invention. A network 510 sends a carrier configuration message 515 to a UE 505. The carrier configuration message contains information relating to downlink carriers, uplink carriers and uplink carrier PHR IDs. Specifically, the carrier configuration message may contain information relating to a DL CC on which the TPC is accumulated and an UL CC. The network 510 previously assigns the PHR IDs to the uplink carriers for which PHRs are set. If the carrier configuration message is successfully received, the UE 505 sends a carrier configuration response 520 to the network 510 in response to the carrier configuration message 515. The UE 505 also configures the carriers at 525 based on information contained in the carrier configuration message. For example, the UE 505 configures UL CC 1, UL CC 2, UL CC 3, UL CC 4 and UL CC 5, and sets UL CC1 and UL CC 3 for PHR (PHR-designated Uplink Carrier). Also, the UE assigns UL CC 1 with PHR ID 0 and assigns UL CC 3 with PHR ID 1.

When the PHR is triggered for UL CC 1 at 530, the UE 505 awaits a next uplink transmission. The next uplink transmission becomes possible when an uplink transmission resource is allocated through the transmission of an uplink grant by the network 510. The network 510 transmits an uplink grant for UL CC 4 at 535. Upon receipt of the uplink grant, the UE 505 generates the PHR on UL CC 4 at 540, which includes the PHR ID 0 assigned to UL CC 1 and the PH of UL CC 1. The PH of UL CC 1 is the difference between the UE maximum transmission power and the required uplink transmission power, when the MAC PDU is transmitted on UL CC 1. Specifically, the PH is calculated reflecting at least the MCS level, the path loss of the downlink carrier corresponding to UL CC 1, and the accumulated TPC of UL CC 1. The UE 505 transmits the MAC PDU containing the PHR ID and PH level to the network 510 over UL CC 4 at 545.

Figure 6:
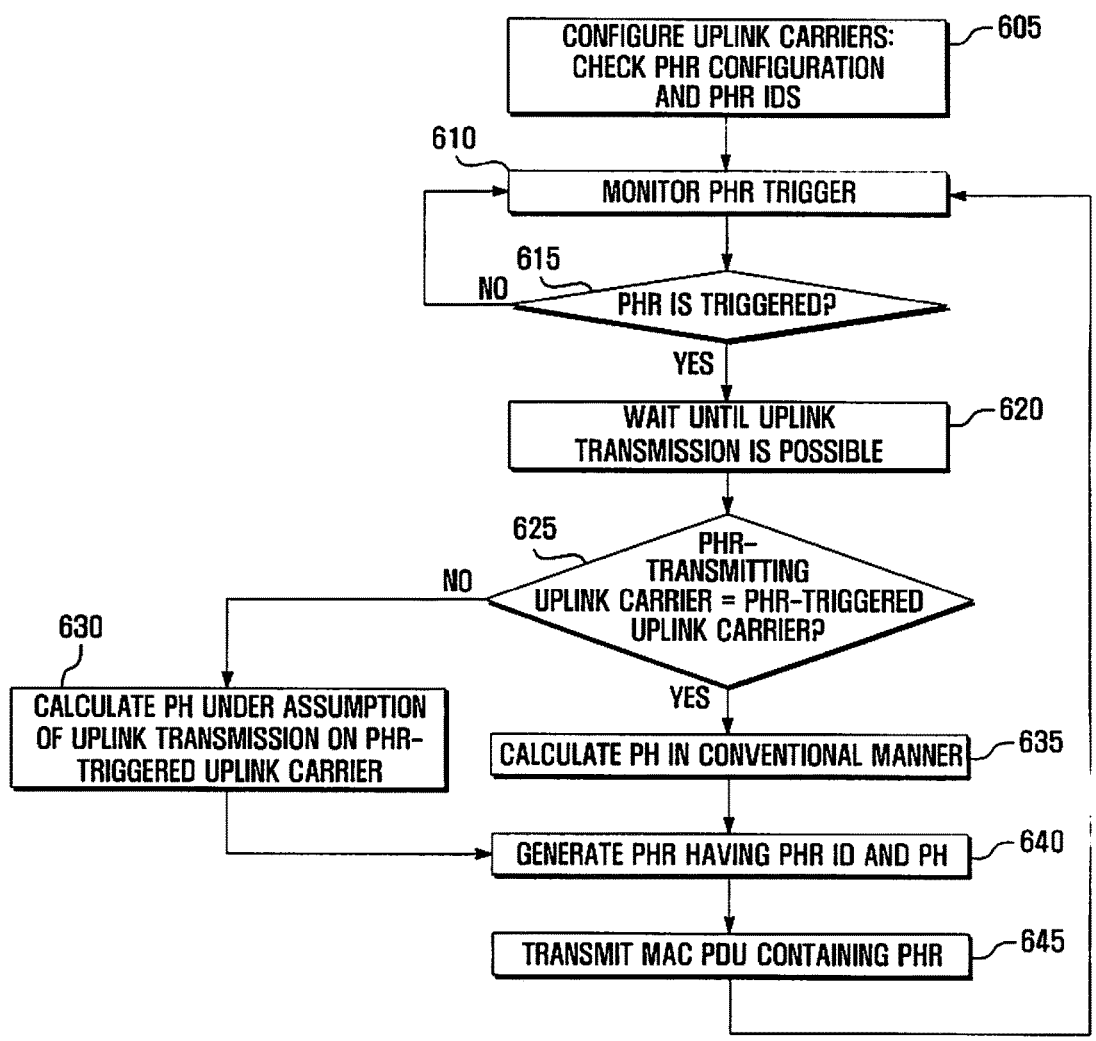
FIG. 6 is a flow diagram illustrating a PH reporting methodology for an LTE-A wireless communication system, according to the first embodiment of the present invention.

FIG. 6 is a flow diagram illustrating a PH reporting methodology for an LTE-A wireless communication system, according to the first embodiment of the present invention.

A UE first receives a carrier configuration message transmitted by an ENB and configures uplink carriers based on information contained in the carrier configuration message in step 605. Specifically, the UE determines which uplink carriers are designated for the PHR and the PHR IDs assigned to these uplink carriers based on the carrier configuration message. In setting the carrier configuration message, the ENB may utilize information indicating that select uplink carriers are likely to be similar in path loss and accumulated TPC. For example, a single uplink carrier in a group of uplink carriers positioned in adjacent frequency bands may be designated for the PHR, as described above with respect to FIG. 4.

After configuring the uplink carriers, the UE monitors for an event triggering a PHR on one of the uplink subcarriers set for PHR in step 610. For example, if the path loss related to an uplink carrier has changed by more than a predetermined reference value since a last PHR or a predetermined time has elapsed since the transmission of a last PHR, the PHR is triggered on that uplink carrier. The UE determines whether a PHR is triggered in step 615. If a PHR is triggered, the methodology proceeds to step 620. If a PHR is not triggered, the methodology returns to step 610. At step 620, the UE waits for allowance of an uplink transmission.

When uplink transmission is allowed, specifically, if an uplink grant for an uplink carrier is received, the UE determines whether the transmission-granted, or PHR-transmitting uplink carrier is identical to the PHR-triggered uplink carrier in step 625. If the PHR-transmitting uplink carrier is identical to the PHR-triggered uplink carrier, the UE calculates a PH of the PHR-triggered uplink carrier in a conventional manner in step 635. Specifically, the UE calculates the PH by subtracting a required uplink transmission power from the UE maximum transmission power. The required uplink transmission power is that of the PHR-transmitting uplink carrier. For example, when an uplink grant is received for transmission over an uplink carrier, the uplink transmission power is that required for the UE to transmit the MAC PDU using the resources and MCS level indicated by the uplink grant.

If the PHR-transmitting uplink carrier is not identical to the PHR-triggered uplink carrier, the UE calculates a PH of the PHR-triggered uplink carrier in step 630, assuming that the uplink transmission is performed on the PHR-triggered uplink carrier. Specifically, the UE calculates the PH by subtracting the transmission power, which is required when the PHR is transmitted on the PHR-triggered uplink carrier using the resources for transmission of the MAC PDU and MCS level indicated by the uplink grant, from the UE maximum transmission power. The PH is calculated in consideration of the path loss and accumulated TPC related to the PHR-triggered uplink carrier.

After calculating the PH in steps 630 or 635, the UE generates a MAC PDU containing the PHR having the PHR ID field and PH level field in step 640, and transmits the MAC PDU to the ENB in step 645. After transmitting the PHR, the process returns to step 610.

In a second embodiment of the present invention, a relationship between an uplink carrier on which the PHR is transmitted (PHR-transmitting uplink carrier) and an uplink carrier of which PH is calculated (PHR-designated uplink carrier) is predetermined. This relationship enables identification of the PHR-designated uplink carrier without changing a PHR format to insert a PHR ID. For example, a UE may aggregate 5 uplink carriers including two uplink carriers designated for PHR UL CC 1 430 and UL CC 3 440, as shown in FIG. 4. The PHR for UL CC 1 430 can be transmitted on one of uplink carriers UL CC 1 430 and UL CC 2 435, and the PHR for UL CC 3 440 can be transmitted on one of uplink carriers UL CC 3 440, UL CC 4 445, and UL CC 5 450. This provides for quick PHR transmission without the use of additional PHR IDs.

Figure 7:
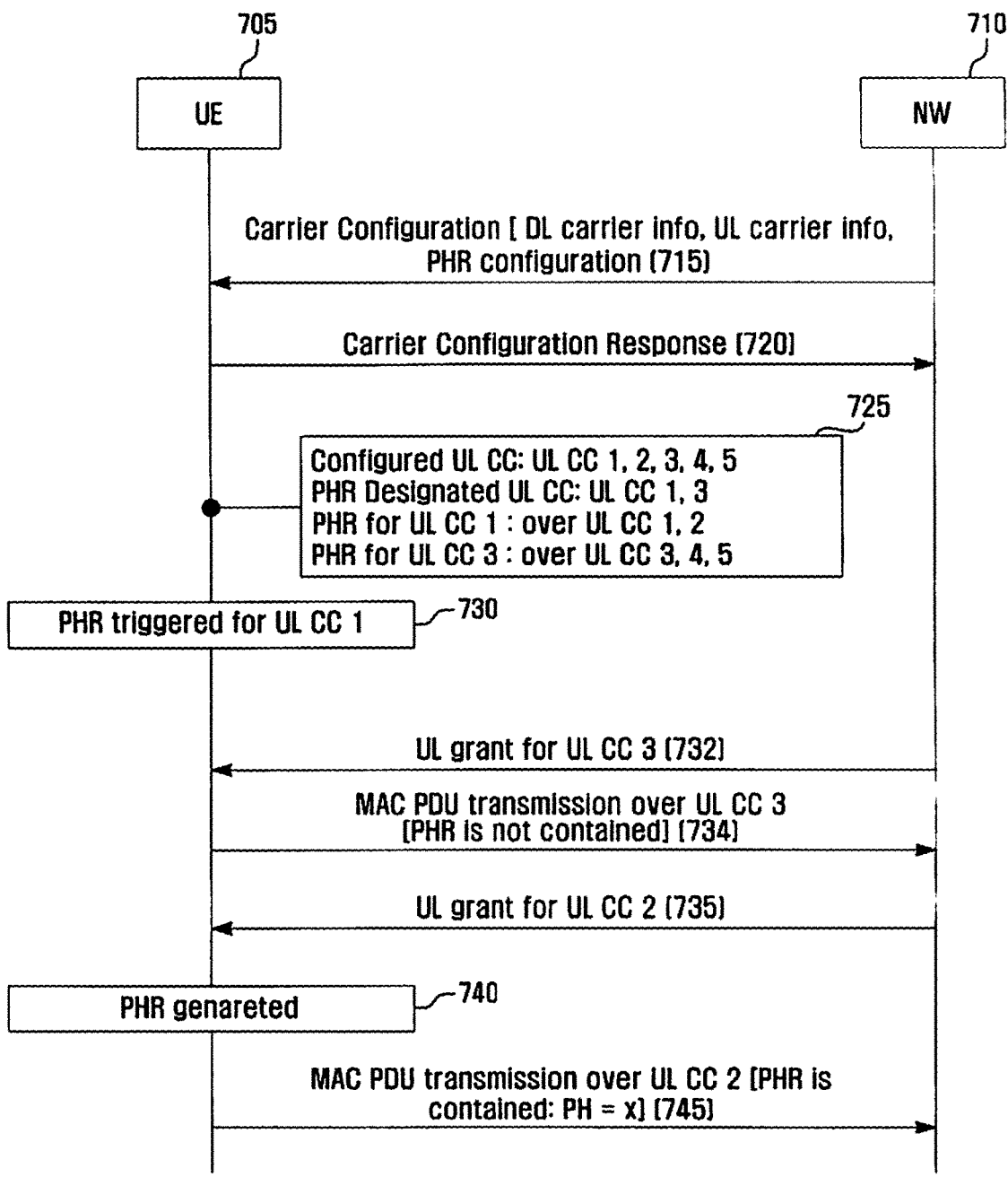
FIG. 7 is a diagram illustrating operations of an LTE-A wireless communication system, according to a second embodiment of the present invention.

Referring now to FIG. 7, a diagram illustrates operations of an LTE-A wireless communication system, according to the second embodiment of the present invention. In FIG. 7, a network 710 sends a carrier configuration message 715 to a UE 705. The carrier configuration message contains information on downlink carriers and uplink carriers. Upon receipt of the carrier configuration message 715, the UE 705 sends a carrier configuration response message 720 to the network 710. The UE 705 configures the carriers based on the configuration information contained in the configuration resource message in 725. For example, the UE 705 configures UL CC 1, UL CC 2, UL CC 3, UL CC 4 and UL CC 5 as aggregated uplink carriers and UL CC 1 and UL CC 3 as PHR-designated uplink carriers. Relationships between the PHR-designated uplink carriers and the PHR-transmitting uplink carriers are also configured. For example, the PHR for UL CC 1 can be transmitted on UL CC 1 and UL CC 2, and the PHR for UL CC 3 can be transmitted on UL CC 3, UL CC 4 and UL CC 5.

When the PHR for UL CC 1 is triggered at 730, the UE awaits allowance of transmission over one of the PHR-transmitting uplink carriers related to UL CC 1, specifically, UL CC 1 and UL CC2. The UE 705 receives a UL grant for UL CC 3 732 from the network 710. Upon receipt of the UL grant for UL CC 3, the UE transmits a MAC PDU 734 over UL CC 3. Although a UL grant is received, the UE 705 does not generate the PHR for UL CC 1, because the PHR for UL CC 1 cannot be transmitted over UL CC 3. The UE 705 receives a UL grant for UL CC 2 735 from the network 710. Upon receipt of the UL grant for UL CC 2 735, the UE 705 generates the PHR for UL CC 1 in 740 and transmits a MAC PDU 745 containing the PHR for UL CC 1 on UL CC 2.

Figure 8:
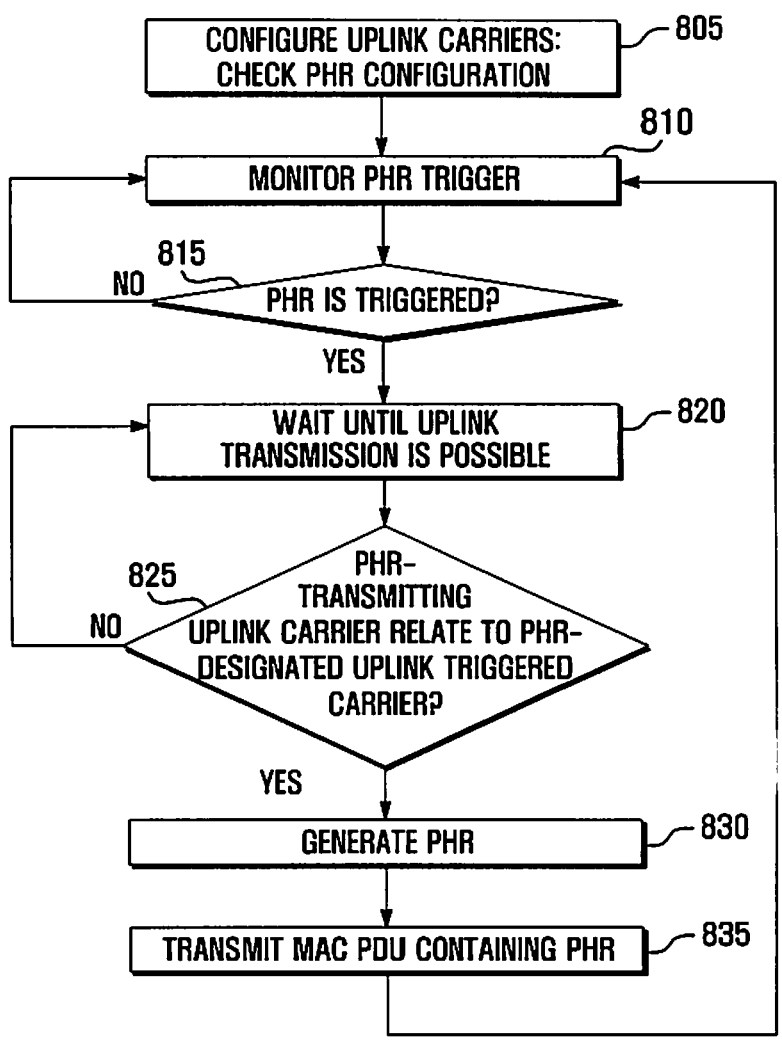
FIG. 8 is a flow diagram illustrating a PH reporting methodology for an LTE-A wireless communication system, according to the second embodiment of the present invention.

FIG. 8 is a flow diagram illustrating a PH reporting methodology for an LTE-A wireless communication system, according to the second embodiment of the present invention.

Referring to FIG. 8, a UE receives a carrier configuration message transmitted by an ENB and configures uplink carriers in step 805. The UE configures PHR-designated uplink carriers and their corresponding PHR-transmitting uplink carriers. Specifically, when a PHR of uplink carrier x designated for PHR is to be transmitted on an uplink carrier y, the uplink carrier x is referred to as related to, or corresponding to, the uplink carrier y. The UE monitors for an event triggering a PHR for a PHR-designated uplink carrier in step 810. For example, if a path loss related to an uplink carrier has changed by a value more than a predetermined reference value since a last PHR, or a predetermined time has elapsed since a transmission of the last PHR, the PHR is triggered on the uplink carrier. The UE determines whether a PHR is triggered in step 815. If a PHR is triggered, the methodology proceeds to step 820. If a PHR is not triggered, the methodology returns to step 810.

At step 820, the UE awaits allowance of a resource for uplink transmission. When the resource for uplink transmission is granted via an uplink grant received from the ENB, the UE determines whether the transmission-granted uplink carrier relates to the triggered PHR-designated uplink carrier in step 825. Specifically, the UE determines whether the triggered PHR can be transmitted on the transmission-granted uplink carrier. If the transmission-granted uplink carrier relates to the triggered PHR-designated uplink carrier, the UE calculates the PH of the PHR-designated uplink carrier and generates the PHR in step 830. If the transmission-granted uplink carrier does not relate to the triggered PHR-designated uplink carrier, the methodology returns to step 820 and the UE continues to await allowance of a resource for uplink transmission through receipt of an uplink grant.

After generating the PHR at step 830, the UE transmits a MAC PDU containing the PHR to the ENB on the transmission-granted, or PHR-transmitting, uplink carrier in step 835, and the methodology returns to step 810.

The PHR is triggered when a path loss used for calculating the PH in a previous PHR transmission has changed by a value more than a reference value, or when a predetermined time has elapsed since the transmission of the previous PHR. Thus, a PHR is triggered only when there has been a previous PHR transmission. Accordingly, when an uplink carrier is configured for PHR, the UE transmits the PHR at the first transmission regardless of the above conditions.

In the conventional system using one downlink carrier and one uplink carrier, a configuration message is received a relatively long time after starting a signal on a corresponding downlink carrier. This allows enough time to properly measure a path loss of the corresponding downlink carrier. Accordingly, it is possible to calculate the PH at the first transmission after the PHR is configured.

When using carrier aggregation, the path loss of the corresponding downlink carrier is not likely to be measured at the time when the uplink carrier is configured. For example, if the UE establishes an initial connection through DL CC 1 405 and UL CC 1 430, the receiver on DL CC 1 405 switches on at a time when the UE powers on. Since it takes a few hundred milliseconds (msec) for the UE to power on and enter the connected state, the path loss measurement of DL CC 1 405 is completed by the time the UE powers on to enter the connection state and receives the message related to the PHR configuration. However, when UL CC 2 435 and related DL CC 2 410 are newly configured, and UL CC 2 435 is configured for PHR, the path loss of DL CC 2 410 is not measured by the time UL CC 2 435 is configured for PHR. For example, the path loss of a downlink carrier may be measured in at least 200 msec, and no path loss measurement exists 200 msec from the start of signal reception on a downlink carrier.

Accordingly, in a third embodiment of the present invention, when a new uplink carrier is configured/activated and configured for PHR, the UE acquires a valid path loss of a corresponding downlink carrier by measuring over a predetermined time and transmits the PHR at a first transmission chance after the measurement. For example, the UE does not generate/transmit a PHR even if a transmission chance is provided before a valid path loss measurement value has been obtained. The PHR is transmitted at the first transmission chance after a valid path loss measurement value is obtained. An uplink carrier is configured/activated when the ENB sends the UE configuration information about the uplink carrier and instructs the UE to prepare for transmission over the uplink carrier. The path loss of a downlink carrier is measured by measuring received strength of a reference signal on the downlink carrier and subtracting the measurement from the downlink transmission power.

Figure 9:
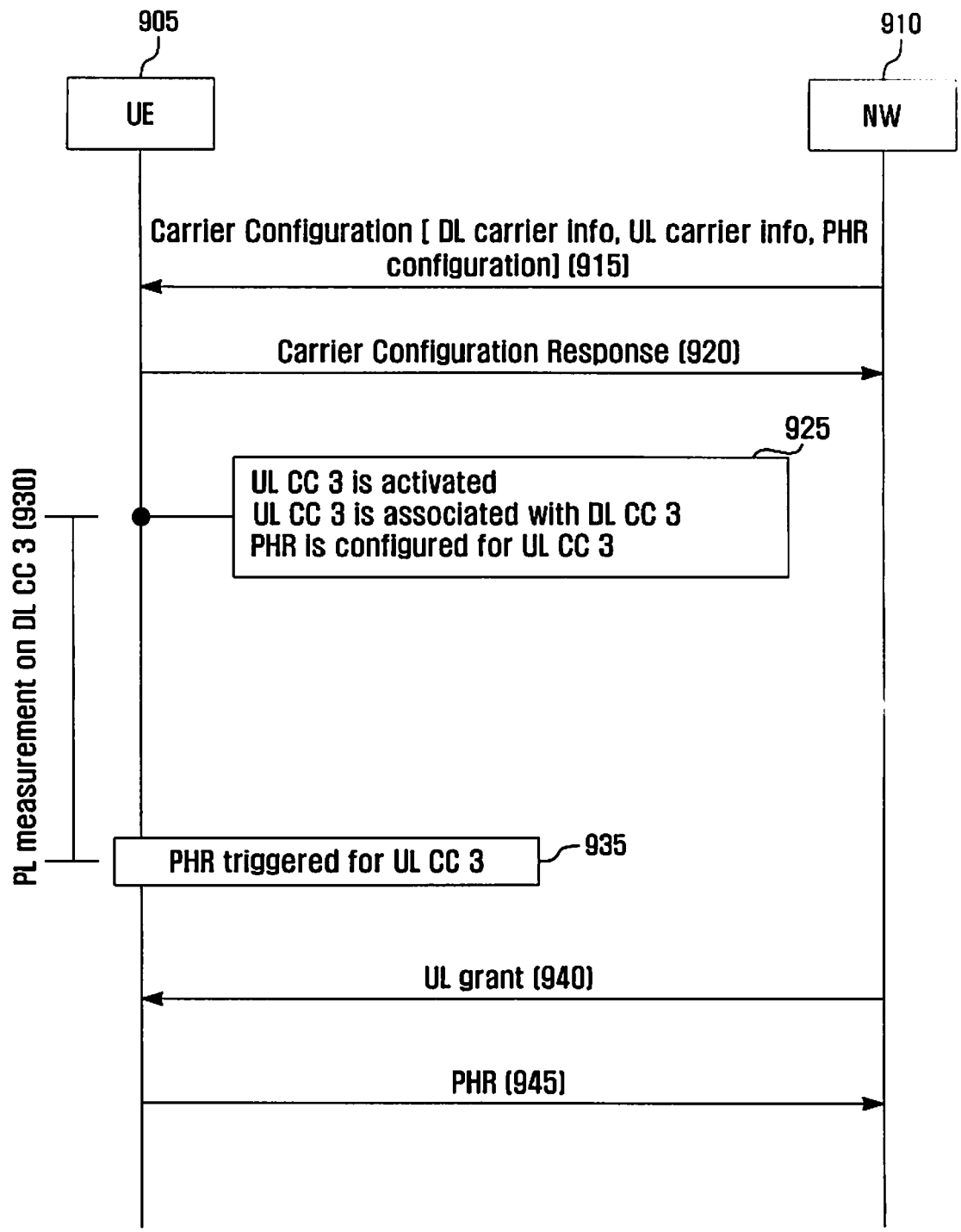
FIG. 9 is a diagram illustrating operations of an LTE-A wireless communication system, according to a third embodiment of the present invention.

FIG. 9 is a diagram illustrating operations of an LTE-A wireless communication system, according to the third embodiment of the present invention.

In FIG. 9, a network 910 sends a carrier configuration message 915 to a UE 905. The carrier configuration message 915 contains information on downlink carriers and uplink carriers to be aggregated. Some of the uplink carriers can be configured for PHR. If the carrier configuration message 915 is received successfully, the UE 905 sends a carrier configuration response message 920 to the network 910 in response to the carrier configuration message and configures the carriers based on the configuration information contained in the carrier configuration message at 925. For example, the UE activates DL CC 3 and UL CC 3, which are related to each other as indicated by the configuration information, and configures UL CC 3 for PHR. The UE measures a path loss of DL CC 3 in 930 and triggers the PHR for UL CC 3 in 935 after a predetermined time has elapsed from the start of the path loss measurement. After the PHR is triggered, the UE receives a UL grant at 940. The UE generates the PHR and sends a MAC PDU containing the PHR at the first transmission after the receipt of the UL grant at 945.

Figure 10:
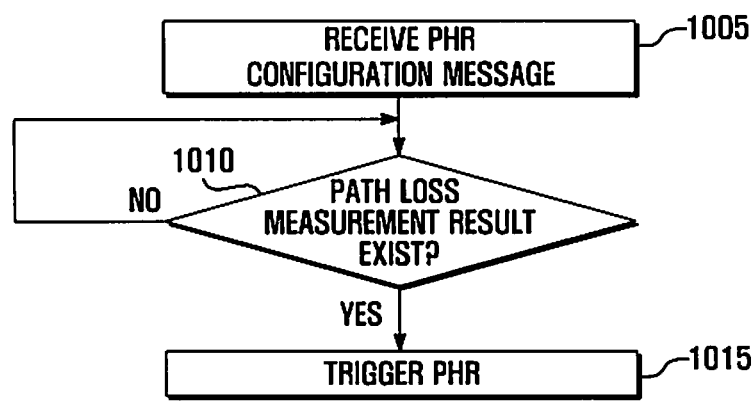
FIG. 10 is a flow diagram illustrating a PH reporting methodology for an LTE-A wireless communication system, according to the third embodiment of the present invention.

Referring now to FIG. 10, a flow diagram illustrates a PH reporting methodology for an LTE-A wireless communication system, according to the third embodiment of the present invention.

A UE first receives a PHR configuration message from an ENB at step 1005. The PHR configuration message contains information about a UL CC to be configured for PHR and parameters related to the PHR. From the PHR configuration message or a previously received carrier configuration message, the UE recognizes a DL CC related to the PHR-designated UL CC.

The UE determines whether a valid path loss measurement value of the DL CC exists in step 1010. A valid path loss measurement value exists when the UE has measured the path loss of the corresponding DL CC for a predetermined duration and thus obtained the measurement value. If the UL CC was already activated, the path loss measurement value of the DL CC exists. Otherwise, if the UL CC is recently activated, for example, by a PHR configuration message, a valid path loss measurement value of the related DL CC is not likely to exist.

If it is determined that a valid path loss measurement value exists at step 1010, the UE triggers the PHR at step 1015. If it is determined that a valid path loss measurement value does not yet exist, the UE waits until the valid path loss measurement value of the related DL CC is obtained.

Figure 11:
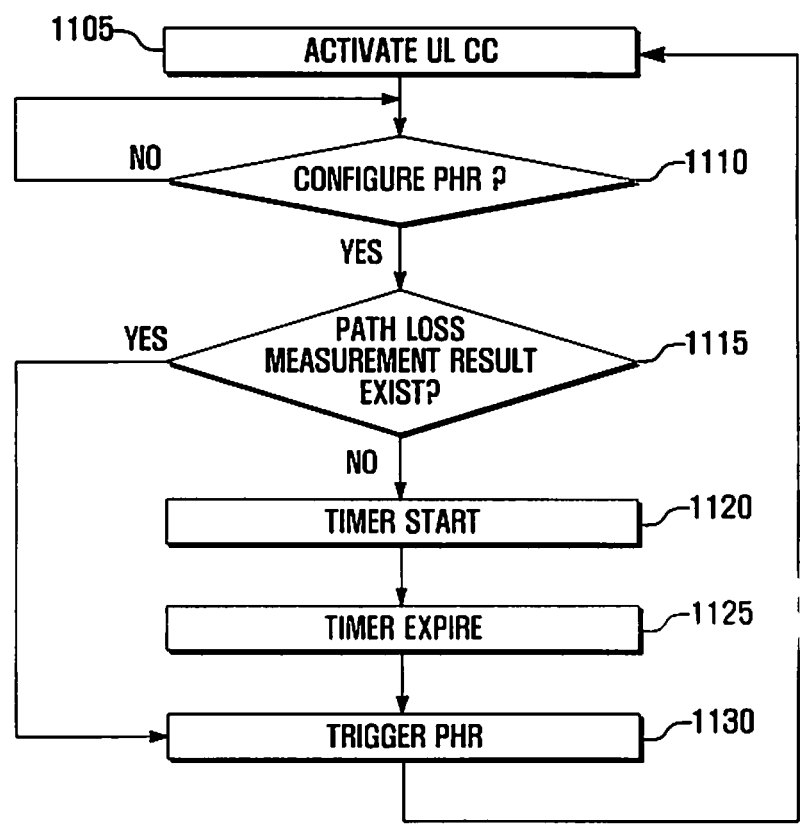
FIG. 11 is a flow diagram illustrating a PH reporting methodology for an LTE-A wireless communication system, according to another embodiment of the present invention.

FIG. 11 is a flow diagram illustrating a PH reporting methodology for an LTE-A wireless communication system, according to another embodiment of the present invention.

A UE receives a control message for activating a UL CC in step 1105. The UE determines whether the new UL CC is configured for PHR in step 1110. If the new UL CC is not configured for PHR, the UE waits until another UL CC is activated. If the new UL CC is configured for PHR, the UE determines whether a valid path loss measurement value of a DL CC related to the new UL CC exists in step 1115. If the DL has been already activated and used, a path loss measurement value of the DL CC exists. If the DL CC is activated with the activation of the UL CC, a path loss measurement value of the DL CC does not yet exist.

If a valid path loss measurement value of the DL CC exists at step 1115, the UE triggers the PHR in step 1130. If a valid path loss measurement value of the DL CC does not exist at step 1115, the UE starts a timer in step 1120 for triggering PHR after the path loss of the related DL CC is measured. The timer can be set with a predetermined duration or a duration indicated by a control message.

As described above, since path loss is calculated after measurement of the received signal quality is performed for at least 200 msec as specified by current Standards, for example, the timer may be set to a fixed value, such as, for example, 200 msec. The timer may also be set to a value equal to any measurement period specified in the Standard. When the timer expires in step 1125, the UE triggers the PHR for the uplink carrier in step 1130.

In the above-described operations of the UE, it is assumed that the PHR is triggered after a valid path loss measurement value is acquired. Since the PHR is generated at the first transmission time after the PHR is triggered, the deferred PHR trigger delays the generation and transmission of the PHR. Accordingly, it is preferable to defer the generation of the PHR after the time point at which the measured path loss can be used while maintaining the conventional PHR triggering mechanism of triggering the PHR right after the PHR configuration. This PHR generation and transmission process in the UE is illustrated in FIG. 12.

Figure 12:
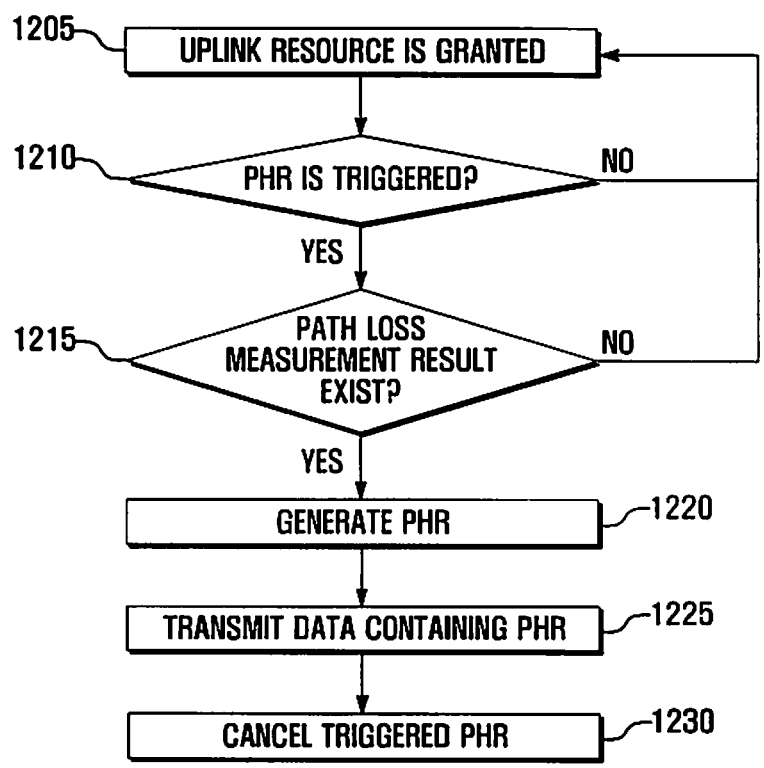
FIG. 12 is a flow diagram illustrating a PH generation and transmission methodology, according to an embodiment of the present invention.

Referring now to FIG. 12, a flow diagram illustrates a PHR generation and transmission methodology, according to an embodiment of the present invention.

An uplink transmission resource is granted at step 1205, and a UE checks whether there is a triggered PHR that has not been transmitted in step 1210. If there is no such triggered PHR that has not been transmitted, the UE waits until a next possible uplink transmission. If there is a triggered PHR that has not been transmitted, the UE determines whether a path loss measurement value for calculating a PH exists in step 1215. Specifically, the UE checks whether a Reference Signal Received Power (RSRP) has been measured on the downlink carrier related to the triggered uplink carrier for a predetermined duration. If no path loss measurement value exists at step 1215, the UE waits until a next possible uplink transmission. If the path loss measurement value exists, the UE generates the PHR at step 1220. The UE transmits a MAC PDU containing the PHR to the ENB in step 1225, and cancels the triggered PHR in step 1230.

Figure 13:
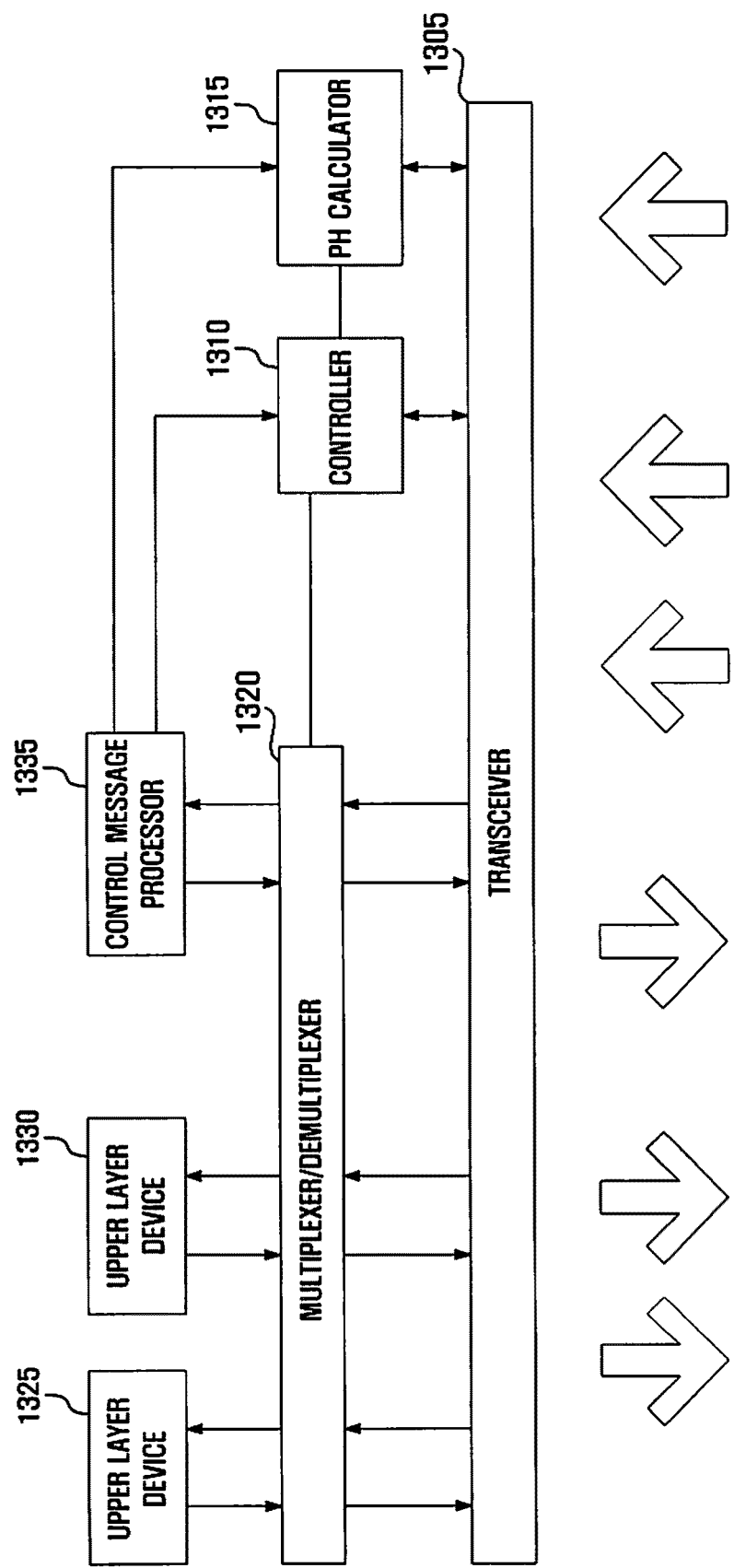
FIG. 13 is a block diagram illustrating a configuration of a UE for an LTE-A wireless communication system, according to an embodiment of the present invention.

FIG. 13 is a block diagram illustrating a configuration of a UE for an LTE-A wireless communication system, according to an embodiment of the present invention.

The UE includes a transceiver 1305, a controller 1310, a PH calculator 1315, a multiplexer/demultiplexer 1320, a control message processor 1335, and upper layer devices 1325 and 1330.

The transceiver 1305 receives data and control signals on downlink carriers and transmits data and control signals on uplink carriers. When multiple carriers are aggregated, the transceiver 1305 transmits and receives the data and control signals over multiple carriers.

The controller 1310 controls the multiplexer/demultiplexer 1320 to generate MAC PDUs based on the control signal, for example, scheduling information contained in the uplink grant. The controller 1310 also determines whether a PHR is triggered, and controls the PH calculator 1315 to calculate a PH of the triggered uplink carrier. Whether the PHR is triggered is determined based on a PHR parameter received from the control message processor 1335. When multiple uplink carriers are configured for PHR, the controller 1310 checks the PHR ID assigned to respective carriers or the related uplink carriers on the basis of the information provided in a control message as described above in the various embodiments. The controller 1310 determines the validity of measurement results on downlink carriers related to the uplink carriers, and controls generation of the PHR only when a valid measurement result is detected. The controller 1310 also generates the PHR using the PH output by the PH calculator 1315 and outputs the PHR to the multiplexer/demultiplexer 1320. The PH calculator 1315 calculates the PH and outputs the calculated PH to the controller 1310 under the control of the controller 1310.

The multiplexer/demultiplexer 1320 multiplexes the data output by the upper layer devices 1325 and 1330 and the control message processor 1335, demultiplexes the data received by the transceiver 1305, and delivers the demultiplexed data to the corresponding upper layer devices 1325 and 1330 and control message processor 1335.

The control message processor 1335 processes the control message transmitted by the network to direct required operations. For example, the control message processor 1335 delivers PHR parameters extracted from the control message to the controller 1310 and information on the newly activated carriers to the transceiver 1305 so that the transceiver 1305 may be set with the carriers. The upper layer devices 1325 and 1330 are activated per service. The upper layer devices 1325 and 1330 process the data generated by user services, such as File Transfer Protocol (FTP) and Voice over IP (VoIP), to deliver the processed data to the multiplexer/demultiplexer 1320. The multiplexer/demultiplexer 1320 also delivers the demultiplexed data to the upper layer devices 1325 and 1330.

Figure 14:
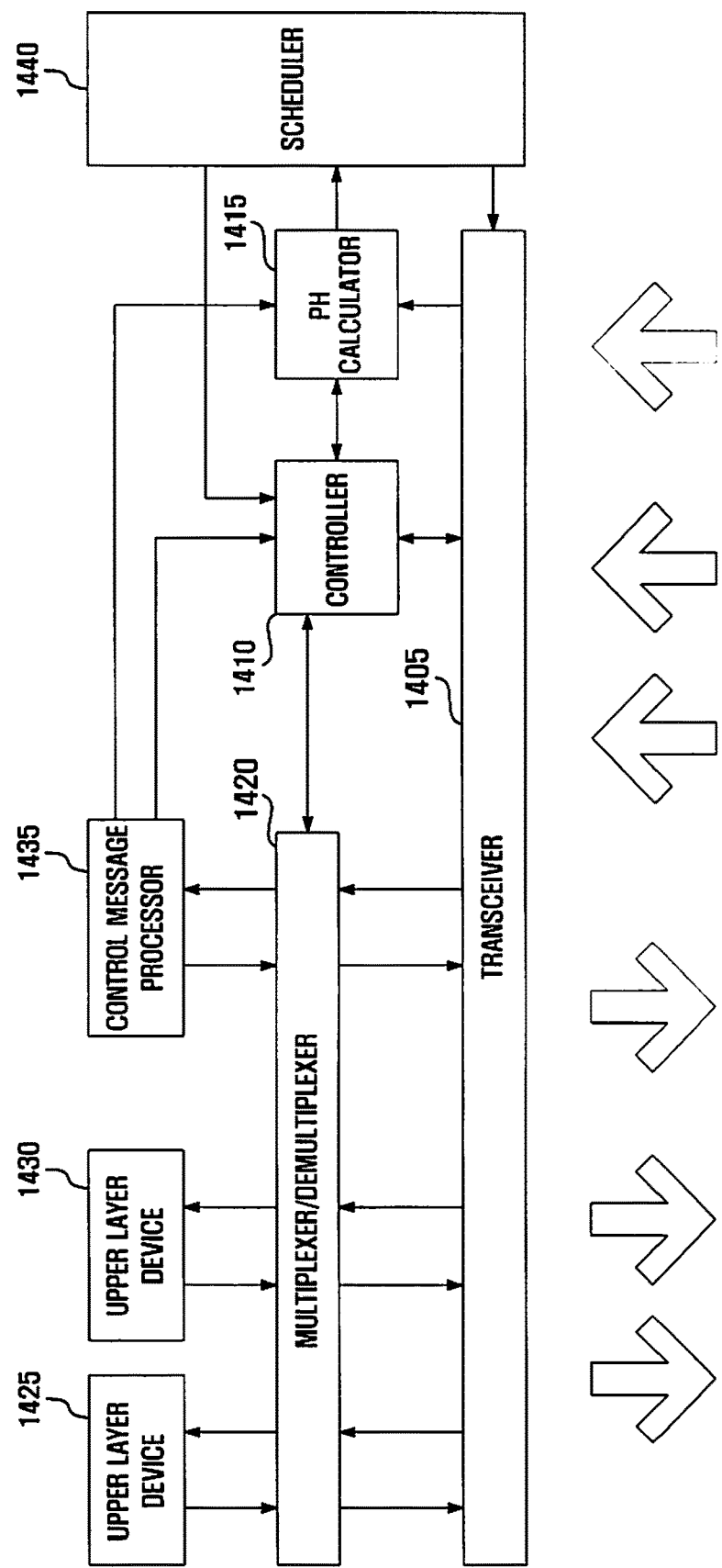
FIG. 14 is a block diagram illustrating a configuration of a base station for an LTE-A wireless communication system, according to an embodiment of the present invention.

FIG. 14 is a block diagram illustrating a configuration of a base station for an LTE-A wireless communication system, according to an embodiment of the present invention. The base station includes a transceiver 1405, a controller 1410, a PH calculator 1415, a multiplexer/demultiplexer 1420, a control message processor 1435, upper layer devices 1425 and 1430, and a scheduler 1440.

The transceiver 1405 transmits data and control signals on downlink carriers and receives data and control signals on uplink carriers. When multiple carriers are aggregated, the transceiver 1405 transmits and receives the data and control signals over multiple carriers.

The controller 1410 controls the multiplexer/demultiplexer 1420 to generate or receive MAC PDUs according to the scheduling of the scheduler 1440. The controller 1410 also determines whether a PHR is contained in the received MAC PDU and, if any, transports PHR to the PH calculator 1415. The PH calculator 1415 recognizes the available transmission power of a specific carrier of the corresponding UE based on the PHR and reports the available transmission power to the scheduler 1440.

The scheduler 1440 performs scheduling in consideration of available transmission power per UE per carrier, reported by the HP calculator 1415, as far as the required transmission power does not exceed the maximum transmission power.

The multiplexer/demultiplexer 1420 multiplexes the data output by the upper layer devices 1425 and 1430 and the control message processor 1435, demultiplexes the data received by the transceiver 1405, and delivers the demultiplexed data to the corresponding upper layer devices 1425 and 1430 and control message processor 1435.

The control message processor 1435 generates a control message to be transmitted to the UE and interprets the control message transmitted by the UE to execute an operation instructed by the control message. The upper layer devices 1425 and 1430 are activated per service, process the data transmitted by the UE and provide the processed data to a node such as S-GW, and process the data transmitted by a node such as the S-GW and deliver the processed data to the multiplexer/demultiplexer 1420.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method by a base station in a wireless communication system, the method comprising:
transmitting, to a terminal, a configuration message to configure at least one uplink carrier;
transmitting, to the terminal, information on an allocation of an uplink transmission resource for a power headroom report (PHR); and
receiving, from the terminal, the PHR,
wherein the PHR associated with a first uplink carrier is triggered if a predetermined event occurs,
wherein it is identified by the terminal whether the first uplink carrier for which a power headroom (PH) is to be determined is different from a second carrier to which the uplink transmission resource is allocated,
wherein a PH included in the PHR is determined based on a first pathloss associated with the first uplink carrier, if the first uplink carrier is different from the second carrier.

2. The method of claim 1, wherein the PH is determined based on a second pathloss associated with the second uplink carrier, if the first uplink carrier is not different from the second carrier.

3. The method of claim 1, wherein the PHR is received from the terminal after a predetermined time period has elapsed from which a control message to activate the first uplink carrier is received by the terminal.

4. The method of claim 3, wherein the PHR is triggered at the terminal prior to reception of the information on the allocation of the uplink transmission resource and after the predetermined time period has elapsed, and
wherein the information on the allocation of the uplink transmission resource is associated with the first uplink carrier.

5. The method of claim 1, wherein the PHR is received on a resource indicated by the information on the allocation of the uplink transmission resource.

6. A base station in a wireless communication system, the method comprising:
a transceiver configured to transmit and receive a signal; and
a controller configured to transmit, to a terminal, a configuration message to configure at least one uplink carrier, to transmit, to the terminal, information on an allocation of an uplink transmission resource for a power headroom report (PHR), and to receive, from the terminal, the PHR,
wherein the PHR associated with a first uplink carrier is triggered if a predetermined event occurs,
wherein it is identified by the terminal whether the first uplink carrier for which a power headroom (PH) is to be determined is different from a second carrier to which the uplink transmission resource is allocated,
wherein a PH included in the PHR is determined based on a first pathloss associated with the first uplink carrier, if the first uplink carrier is different from the second carrier.

7. The base station of claim 6, wherein the PH is determined based on a second pathloss associated with the second uplink carrier, if the first uplink carrier is not different from the second carrier.

8. The base station of claim 6, wherein the PHR is received from the terminal after a predetermined time period has elapsed from which a control message to activate the first uplink carrier is received by the terminal.

9. The base station of claim 8, wherein the PHR is triggered at the terminal prior to reception of the information on the allocation of the uplink transmission resource and after the predetermined time period has elapsed, and
wherein the information on the allocation of the uplink transmission resource is associated with the first uplink carrier.

10. The base station of claim 6, wherein the PHR is received on a resource indicated by the information on the allocation of the uplink transmission resource.

* * * * *